(12) United States Patent
Mikami

(10) Patent No.: US 7,708,450 B2
(45) Date of Patent: May 4, 2010

(54) LIQUID CRYSTAL DISPLAY DEVICE

(75) Inventor: Kazuaki Mikami, Kanagawa (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 11/265,089

(22) Filed: Nov. 3, 2005

(65) Prior Publication Data
US 2006/0098458 A1    May 11, 2006

(30) Foreign Application Priority Data
Nov. 8, 2004    (JP)    ............................. 2004-323648

(51) Int. Cl.
*G02F 1/1333*    (2006.01)
*G09F 13/04*    (2006.01)
*F21V 7/04*    (2006.01)

(52) U.S. Cl. .......................... 362/632; 362/97.3; 349/60

(58) Field of Classification Search ................. 362/561, 362/231, 27, 555, 606, 237, 240, 247, 248, 362/300, 307, 310, 347, 390, 560, 581, 29, 362/609, 31, 279, 241, 267, 369, 634, 97.3, 362/306; 349/63, 65, 67, 62, 60
See application file for complete search history.

(56) References Cited

U.S. PATENT DOCUMENTS

| | | | | |
|---|---|---|---|---|
| 4,967,328 A * | 10/1990 | Tatavoosian | ................. | 362/267 |
| 5,008,658 A * | 4/1991 | Russay et al. | ................. | 345/87 |
| 5,469,341 A * | 11/1995 | Green | ......................... | 362/542 |
| 6,099,147 A * | 8/2000 | Ziegenfuss | .................. | 362/319 |
| 6,315,440 B1* | 11/2001 | Satoh | ......................... | 362/561 |
| 6,951,401 B2* | 10/2005 | Van Hees et al. | ............. | 362/612 |
| 7,086,774 B2* | 8/2006 | Katsuda et al. | ............. | 362/634 |
| 2001/0019479 A1* | 9/2001 | Nakabayashi et al. | ......... | 362/31 |
| 2002/0097579 A1* | 7/2002 | Stalions | ....................... | 362/241 |
| 2002/0149719 A1* | 10/2002 | Kanatsu et al. | ............. | 349/112 |
| 2003/0128538 A1* | 7/2003 | Shinohara et al. | ............. | 362/31 |
| 2004/0037077 A1* | 2/2004 | Showers et al. | ............. | 362/249 |
| 2004/0119908 A1* | 6/2004 | Sakai | .......................... | 349/65 |
| 2005/0243243 A1* | 11/2005 | Koganezawa | ................ | 349/62 |

(Continued)

FOREIGN PATENT DOCUMENTS

JP    2-129893    10/1990

(Continued)

OTHER PUBLICATIONS

Machine translation of Mori and Sakai (JP 2004-158336) from Japanese Patent office web page accessed on Jul. 29, 2008.*

(Continued)

*Primary Examiner*—Jong-Suk (James) Lee
*Assistant Examiner*—David R Crowe
(74) *Attorney, Agent, or Firm*—McGinn IP Law Group, PLLC

(57) ABSTRACT

A liquid crystal display device includes an LED backlighting unit and a liquid crystal display panel disposed on the backlighting unit. The backlighting unit includes a light source of an array of LEDs and a reflector disposed so as to cover the light source and configured to reflect light emitted from the light source. And a light shielding spacer member is provided between the reflector and the LED light source.

20 Claims, 9 Drawing Sheets

U.S. PATENT DOCUMENTS

2006/0215387 A1* 9/2006 Wang et al. .................. 362/29
2006/0268571 A1* 11/2006 Harada et al. ............... 362/607

FOREIGN PATENT DOCUMENTS

| JP | 2000-122573 | | 4/2000 |
|----|----|----|----|
| JP | 2002-202740 | | 7/2002 |
| JP | 2002344095 A | * | 11/2002 |
| JP | 2004-79974 | | 3/2004 |
| JP | 2004-118205 | | 4/2004 |
| JP | 2004-158336 | | 6/2004 |
| JP | 2004-199967 | | 7/2004 |
| KR | 2004-0048486 | | 6/2004 |
| KR | 10-2004-0057270 | | 7/2004 |
| KR | 2004056765 A | * | 7/2004 |
| WO | WO 2004/008233 A1 | | 1/2004 |

OTHER PUBLICATIONS

Machine translation of Asano (JP 2004-158336) from Japanese Patent office web page accessed on Jul. 29, 2088.*
Machine translation of Asano (JP 2002-202740) from Japanese Patent office web page accessed on Jul. 29, 2088.*
Korean Office Action dated Jan. 31, 2007 with partial English Translation.
Chinese Office Action dated Jun. 29, 2007, with English-Language translation.
Korean Office Action dated Jul. 5, 2007, with partial English translation.
Japanese Office Action dated Feb. 26, 2008 with Partial English translation.

* cited by examiner

US 7,708,450 B2

LIQUID CRYSTAL DISPLAY DEVICE

BACKGROUND OF THE INVENTION

1. Field of the Invention

The present invention relates to a liquid crystal display device with a backlighting unit, more specifically to an LED backlighting unit for a liquid crystal display panel.

2. Description of the Related Art

A liquid crystal display device used in a personal computer or a cellular telephone has a backlighting unit for a liquid crystal display (LCD) panel. A cold cathode fluorescent lamp has been used as a white light source for the backlighting unit. Recently, however, an array of red, green and blue light emitting diodes (LEDs) with a color-mixing optical waveguide is proposed as the white light source for an LED backlighting unit in view of its long lifetime and excellent light emission.

When the LED backlighting unit is used for a medium-sized or large-sized LCD panels, it is necessary to apply a large number of LEDs in order to gain required luminance. The numbers of the LEDs for the red, green, and blue colors may be different from one another in order to obtain required luminance values. When using the LEDs of these three colors, it is necessary to mix the respective colors appropriately to emit a uniform white color toward a display surface. Accordingly, it is necessary to use a color-mixing optical waveguide in addition to a conventional main optical waveguide.

Examples of a liquid crystal display device with the LED backlighting unit are disclosed in Japanese Unexamined Patent Publications Nos. 2004-199967 and 2004-118205.

FIG. 1 is a cross-sectional view showing a configuration of a liquid crystal display device of this type. As shown in FIG. 1, a color-mixing optical waveguide 4 is disposed under an optical wave guide 5 substantially in parallel. An LED 1 and a reflector 3 are disposed under a substantially central part of the optical waveguide 5 and in the vicinity of an incident surface of the color-mixing optical waveguide 4. As to the LED 1, three types of LEDs respectively configured to emit the wavelengths corresponding to the red, green, and blue colors are used as the light source.

The reflector 3 reflects light emitted from the LED 1 and guides the light to the color-mixing optical waveguide 4. A semi-cylindrical reflector 6 is disposed at an emitting surface side of the color-mixing optical waveguide 4. Surfaces of the reflectors 3 and 6 are formed into mirror planes so as to reflect the light efficiently.

To reflect the light toward the optical waveguide 5, the reflector 6 is provided so as to surround the emitting surface of the color-mixing optical waveguide 4 and a side surface of the optical waveguide 5. An optical sheet 7 and an LCD panel 8 are disposed on a display surface side of the optical waveguide 5. A reflection sheet 9A is disposed on the opposite side to the display surface side of the optical waveguide 5. The reflection sheet 9A is bent at an end portion of an aluminum frame 9B, and is fitted to an upper surface of the color-mixing optical waveguide 4 by use of a fixture 9C.

The optical sheet 7 includes a diffusion sheet, a protection sheet, a prism sheet, and the like. The optical sheet 7 diffuses or condenses the incident light and emits the light toward the LCD panel 8.

The LCD panel 8 applied hereto may be similar to a conventional LCD panel. Therefore, description of the LCD panel 8 will be omitted. Light propagation in the liquid crystal display device will be described with reference to FIG. 1. The light from the LED 1 is made incident onto the incident surface of the color-mixing optical waveguide 4 either directly or after being reflected by the reflector 3. The incident light on the incident surface of the color-mixing optical waveguide 4 is propagated and subjected to color mixing inside the color-mixing optical waveguide 4. The light sufficiently mixed together and converted into the white light is emitted from the emitting surface of the color-mixing optical waveguide 4 and is then incident on the reflector 6. The reflector 6 reflects the light emitted from the color-mixing optical waveguide 4 toward the optical waveguide 5.

The incident light on the optical waveguide 5 spreads uniformly over the entire surface thereof, and is emitted toward an emitting surface provided with the optical sheet 7 and the LCD panel 8. A sheet or a tape made of polyethylene terephthalate (PET), polycarbonate, or the like on which silver or the like is evaporated, a white sheet, a white tape, and the like is used as the reflection sheet 9A. The reflection sheet 9A reflects the light emitted from a lower surface of the optical waveguide 5 causing the light to be incident again on the optical waveguide 5. In this way, the reflection sheet 9A improves light use efficiency.

However, the liquid crystal display device shown in FIG. 1 has the following problems. First, the LED 1 and the reflector 3 cannot maintain close contact due to variation in terms of dimensions and a position of fixation of the reflector 3. As a consequence, a gap is caused between the LED 1 and the reflector 3, and the light leaks out from the gap and luminance efficiency is thereby deteriorated. Second, the reflector 3 made of metal is located close to the LED 1. Accordingly, a large stress may be applied from the metal reflector 3 to the LED 1 due to vibrations or impacts, and the LED 1 tends to be damaged easily.

SUMMARY OF THE INVENTION

The present invention is to provide a liquid crystal display device with an LED backlighting unit having red, green, and blue LEDs as a light source, which is capable of preventing light leakage from a gap between an LED and a reflector.

A first aspect of the liquid crystal display device of the present invention includes a backlighting unit and a liquid crystal display panel disposed on the backlighting unit. This backlighting unit includes a light source and a reflector disposed so as to cover the light source and configured to reflect light emitted from the light source.

And this backlighting unit includes a light shielding spacer member provided between the reflector and the light source.

A second aspect of the liquid crystal display device of the present invention includes a backlighting unit with a liquid crystal display panel disposed on the backlighting unit. This backlighting unit includes a light source and a first reflector disposed so as to cover the light source and configured to reflect light emitted from the light source. This backlighting unit further includes a first optical waveguide for allowing the light reflected by the first reflector to be incident on an incident surface and guiding the light toward an emitting surface, a second reflector to reflect the light emitted from the first optical waveguide and a second optical waveguide disposed above the first optical waveguide to allow the light reflected by the second reflector to be incident and to guide the light toward an entire surface. And this backlighting unit includes a spacer member provided between the reflector and the light source.

The present invention provides a liquid crystal display device with a LED backlighting unit in which an LED light source is closely attached to a reflector disposed on the light source while interposing a light shielding spacer member therebetween. This light shielding spacer member suppresses light leakage from the reflector member to the outside to improve efficiency of the backlight liminescence. Moreover, the light shielding spacer member of the present invention prevents direct contact between the LED light source and the reflector member. As a result, the light shielding spacer member can absorb stresses attributable to vibration of the reflector member or impacts and prevent the LED light source from being damaged by the reflector member.

BRIEF DESCRIPTION OF THE DRAWINGS

The above and other objects, features, and advantages of the present invention will become more apparent from the following detailed description when taken in conjunction with the accompanying drawings wherein.

DETAILED DESCRIPTION OF THE PREFERRED EMBODIMENTS

Now, preferred embodiments of the present invention will be described with reference to the accompanying drawings.

Figure 1:
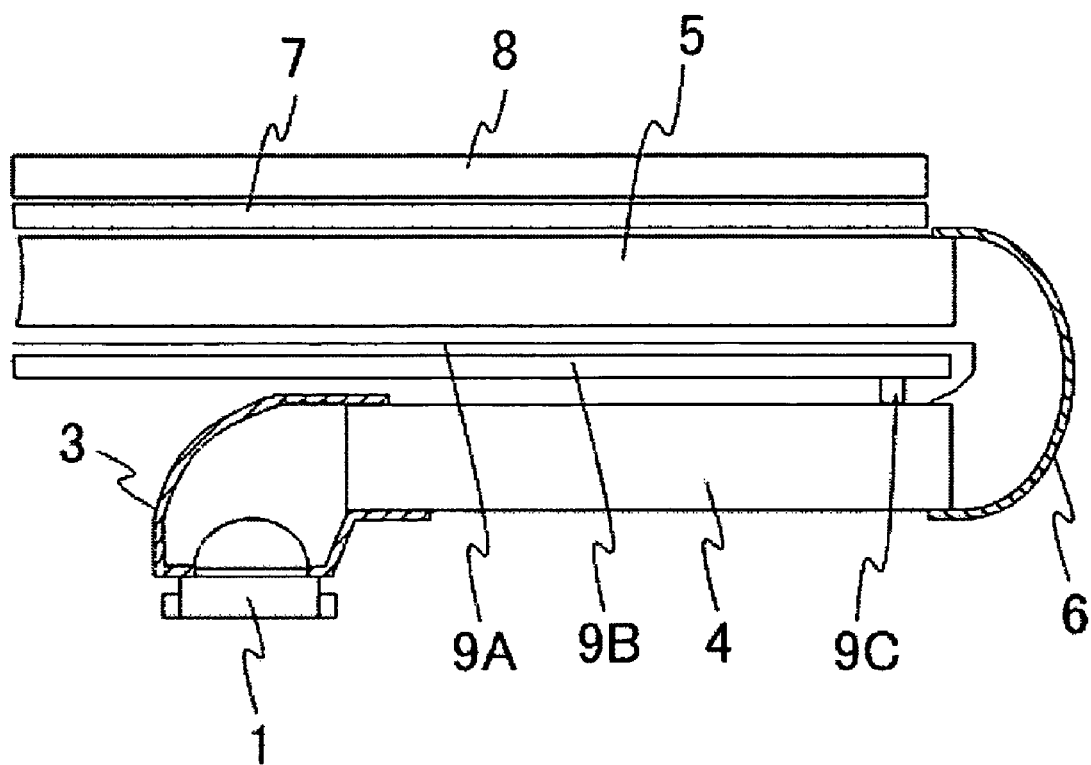
FIG. 1 is a cross-sectional view showing a configuration of a conventional liquid crystal display device including an LED light source.
Figure 2:
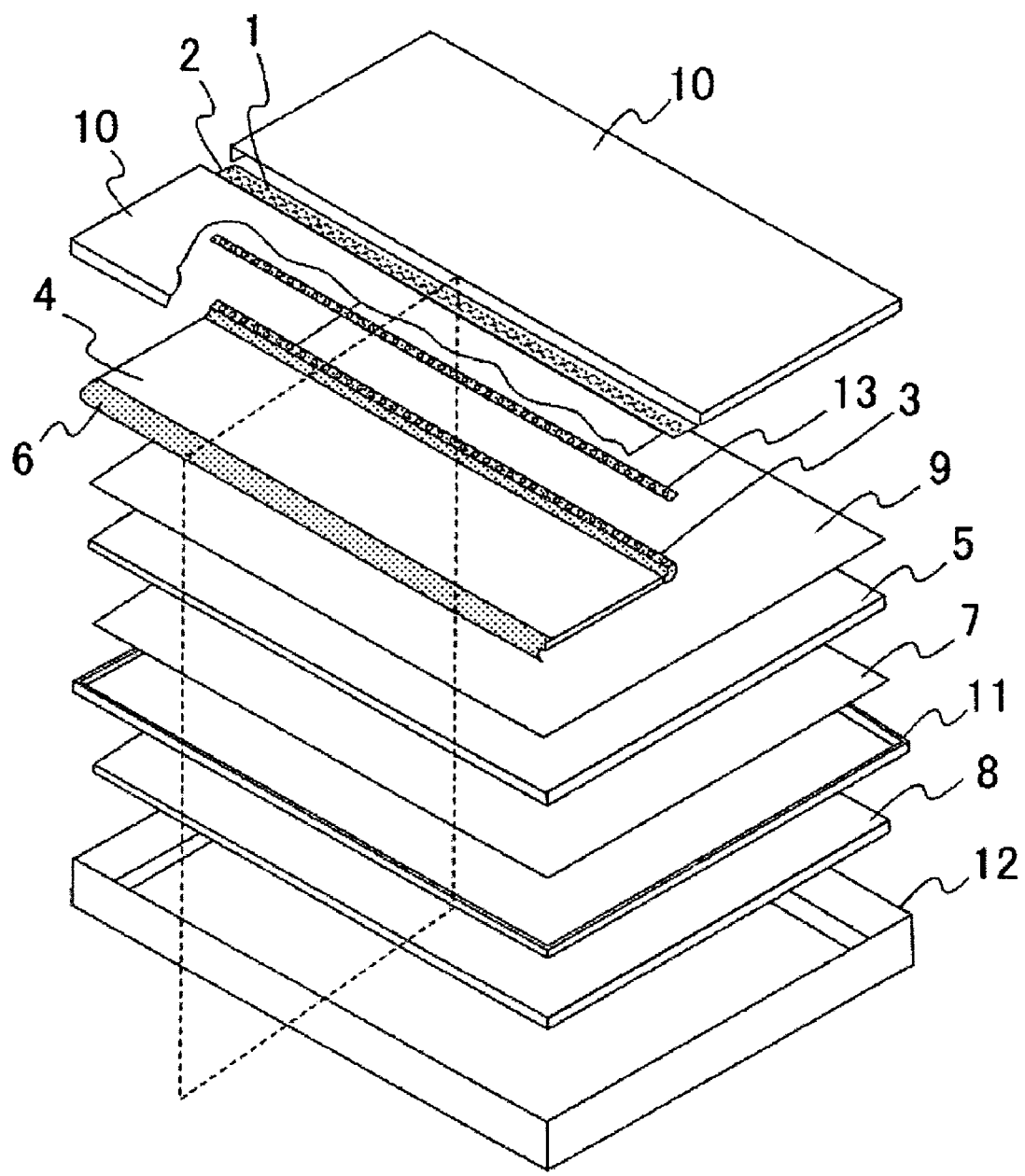
FIG. 2 is a perspective view showing a configuration of a liquid crystal display device according to a first embodiment of the present invention.
Figure 3:
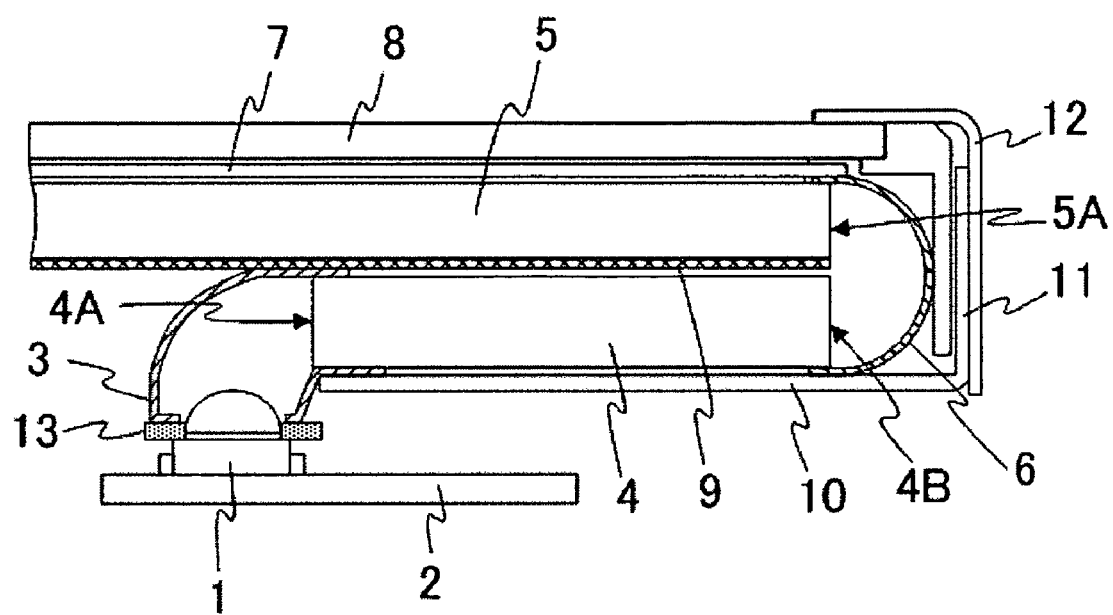
FIG. 3 is a cross-sectional view of a substantial part of the liquid crystal device relevant to a rectangle illustrated with dashed lines in FIG. 2.
Figure 4A:
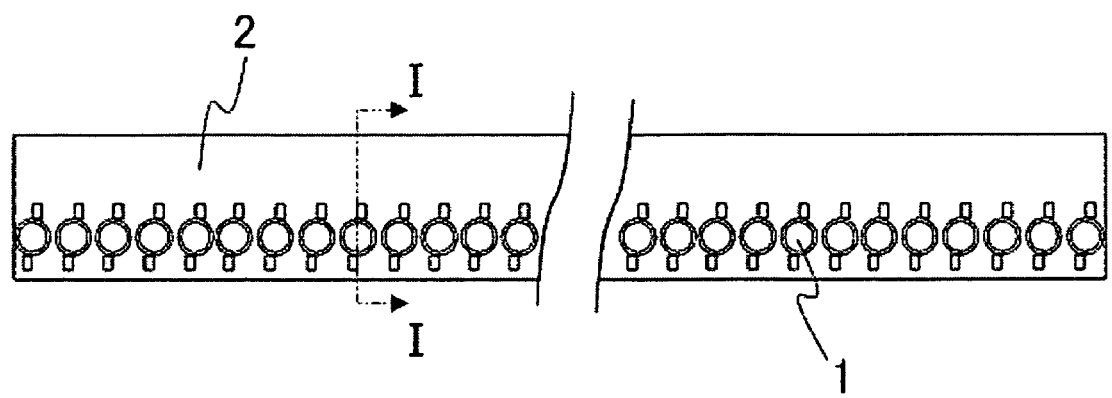
FIG. 4A is a plan view showing a state where LEDs are mounted on a substrate of the liquid crystal display device according to the first embodiment of the present invention.
Figure 4B:
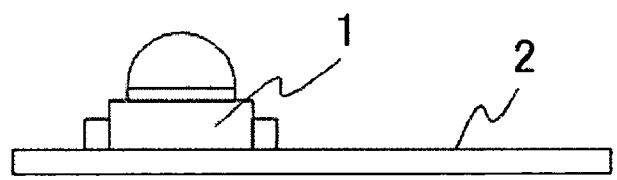
FIG. 4B is a cross-sectional view taken along the I-I line in FIG. 4A.

As shown in FIG. 2 and FIG. 3, a liquid crystal display device of the present invention includes a substrate 2 on which an array of color LEDs 1 configured to emit red light, green light, and blue light are mounted. FIG. 4A is a plan view showing a state where the LEDs 1 are mounted on the substrate 2, and FIG. 4B is a cross-sectional view taken along the I-I line in FIG. 4A.

An insulative wiring substrate such as an epoxy resin substrate is used as the substrate 2. Moreover, the liquid crystal display device of the present invention includes a reflector 3, which is disposed on the LEDs 1 so as to cover the LEDs 1 and is configured to reflect light emitted from the LEDs 1.

Figure 6A:
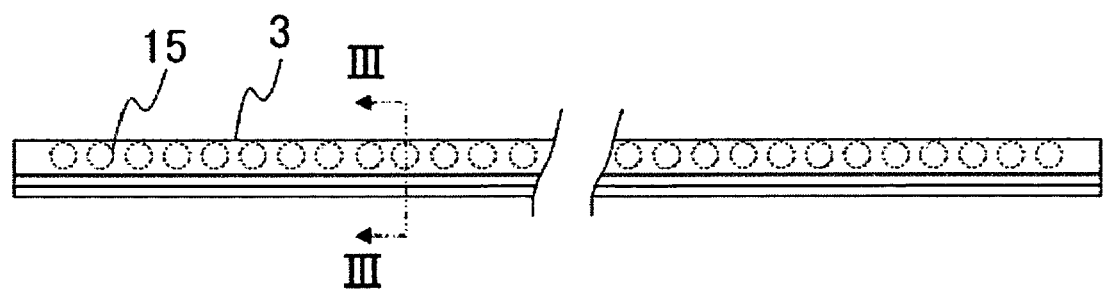
FIG. 6A is a plan view showing a reflector to be disposed on an LED mounting substrate of the liquid crystal display device according to the first embodiment of the present invention.
Figure 6B:
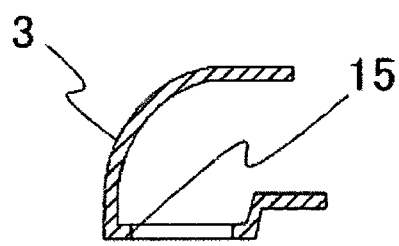
FIG. 6B is a cross-sectional view taken along the III-III line in FIG. 6A.

FIG. 6A is a plan view of the reflector 3 and FIG. 6B is a cross-sectional view taken along the III-III line in FIG. 6A. In FIG. 6A, reference numeral 15 denotes apertures provided on a bottom surface of the reflector 3.

A composite material formed by attaching a highly reflective film to a metal plate such as aluminum, stainless steel or brass is used as the reflector 3.

Transparent resin on which Ag or Al is evaporated, or white resin can be used as the highly reflective film.

A light shielding spacer member 13 is provided between the reflector 3 and the LED 1.

The shielding spacer member 13 prevents the light emitted from the LED 1 from leaking out of a gap between the LED 1 and the reflector 3. The light shielding spacer member 13 is made of a resin material having a plate shape and elasticity. Epoxy resin, polyurethane resin, silicon resin, and the like can be used as this elastic resin material. Here, the light shielding spacer member 13 is pressed by the reflector 3 and the LED 1 from both sides and is thereby fixed such that an air gap is provided between the LED 1 and the reflector 3.

The light shielding spacer member 13 absorbs stresses from the reflector 3 to the LEDs 1 attributable to vibrations and impacts, and thereby prevents damages of the LEDs 1. Silicon resin constituting the light shielding spacer member 13 is usually white.

However, it is also possible to use silicon resin by attaching a metal film such as Al or Ag having high light reflectivity to a surface thereof.

Figure 5A:
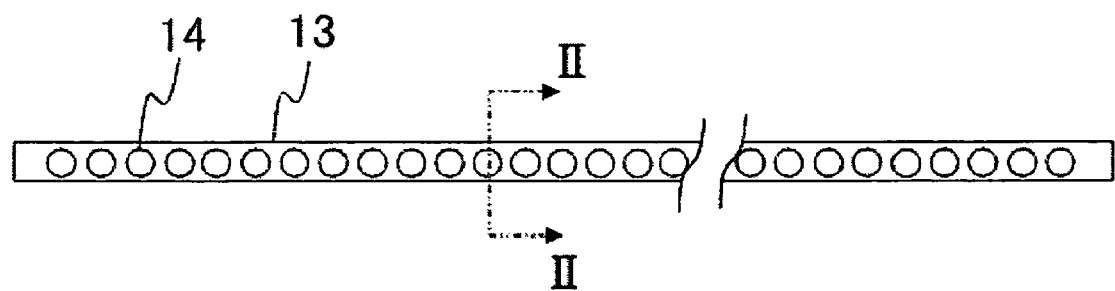
FIG. 5A is a plan view showing a light shielding spacer member of the liquid crystal display device according to the first embodiment of the present invention.
Figure 5B:
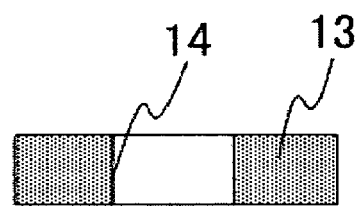
FIG. 5B is a cross-sectional view taken along the II-II line in FIG. 5A.
Figure 7:
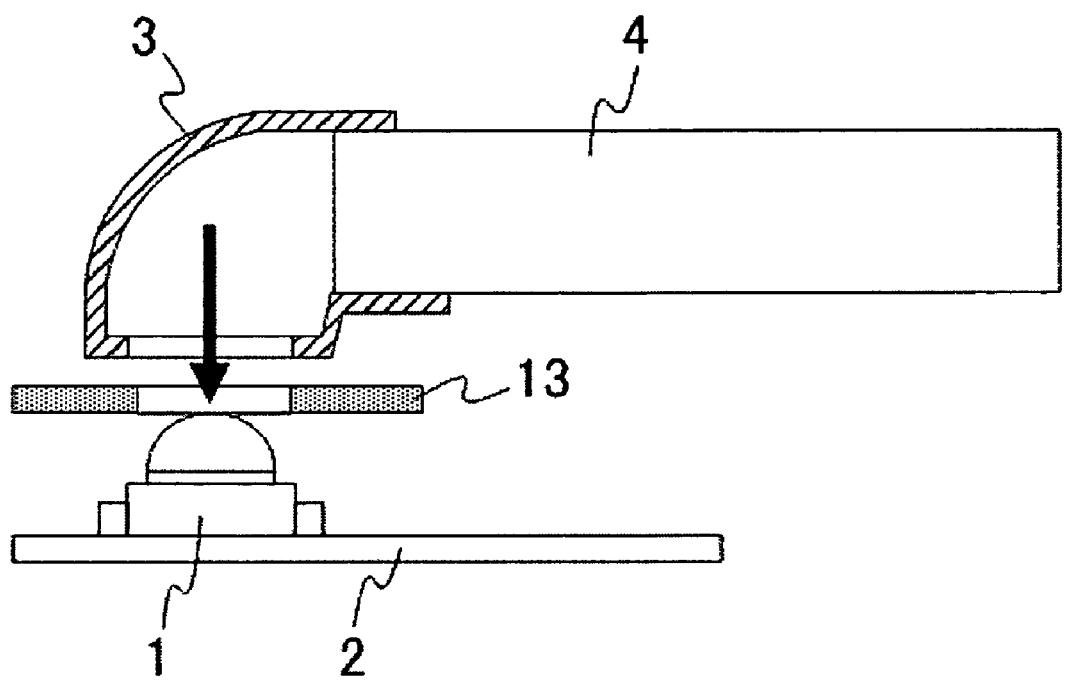
FIG. 7 is a cross-sectional view for explaining a method of placing the reflector fixed to a color-mixing optical waveguide of the liquid crystal display device according to the first embodiment of the present invention on the LED mounting substrate while interposing the light shielding spacer member.

FIG. 5A is a plan view showing the light shielding spacer member 13. FIG. 5B is a cross-sectional view taken along the II-II line in FIG. 5A. In FIG. 5A, reference numeral 14 denotes apertures provided on the light shielding spacer member 13. The diameter of these apertures 14 are set larger than the outside diameter of light emitting bodies of the LEDs 1 and smaller than the diameter of the apertures 15 on the reflector 3. An end of the reflector 3 located opposite with the LEDs 1 is fixed so as to sandwich an end on an incident side of a color-mixing optical waveguide 4 by use of the end of the reflector 3. As shown in FIG. 7, the reflector 3 fixed to the color-mixing optical waveguide 4 is assembled so as to be placed on the substrate 2 that mount the LEDs 1 while interposing the light shielding spacer member 13 therebetween. The color-mixing optical waveguide 4 brings in the light reflected by the reflector 3 and performs color mixing.

A reflector 6 for reflecting the mixed light emitted from the color-mixing optical waveguide 4 is disposed on an end of the color-mixing optical waveguide 4 located opposite to the reflector 3. Similarly to the reflector 3, a composite material formed by attaching a highly reflective film to a metal plate such as aluminum, stainless steel or brass can be used as the reflector 6. Transparent resin on which Ag or Al is vapor-deposited, or white resin can be used as the highly reflective film. Note that a reflecting surface of the reflector 6 is formed into a curved surface in FIG. 3. However, the shape of the reflecting surface is not limited only to the curved surface. For example, it is also possible to apply two planar reflecting surfaces crossed at a predetermined angle.

An optical waveguide 5 for illumination is disposed on the color-mixing optical waveguide 4 while interposing a reflection sheet 9. The light emitted from the color-mixing optical waveguide 4 and reflected by the reflector 6 is made incident on the optical waveguide 5. The reflector 6 is provided so as to surround side surfaces of the ends of the color-mixing optical waveguide 4 and of the optical waveguide 5. The color-mixing optical waveguide 4 and the optical waveguide 5 are formed by use of a transparent material such as acrylic or glass plates. The reflection sheet 9 reflects the light, which is reflected by the reflector 6 and is incident on the optical waveguide 5, toward the LCD panel. A plastic sheet such as polyethylene on which a metal film such as aluminum (Al) or silver (Ag) is evaporated can be used as the reflection sheet 9.

An optical film 7 is disposed on an illuminating surface of the optical waveguide 5 for illumination. The optical film 7 includes a diffusion sheet, a protection sheet, a prism sheet, and the like. The optical sheet 7 diffuses or condenses the light which is made incident from a rear surface thereof, and emits the light from a front surface toward an LCD panel 8. The LCD panel 8 includes a thin film transistor (TFT) array substrate on which TFTs are formed, a counter substrate, and a liquid crystal layer inserted between these two substrates. The LCD panel 8 applied hereto may be similar to a conventional LCD panel. Therefore, description of the LCD panel 8 will be omitted. Note that FIG. 2 and FIG. 3, reference numeral 10 denotes a rear cover, reference numeral 11 denotes a chassis, and reference numeral 12 denotes a front cover.

The elastic light shielding spacer member 13 is inserted between the LEDs 1 and the reflector 3 in the liquid crystal device of this embodiment. The light shielding spacer member 13 is pressed by the reflector 3 and the LED 1 from both sides and is thereby fixed.

Accordingly, if there is a variation in distance between the LED 1 and the reflector 3 due to unevenness in the dimensions of components or alignment upon assembly, the light shielding spacer member 13 will bury a gap and thereby suppresses light leakage from the reflector 3. Moreover, since open portions of the light shielding spacer members 13 are formed smaller than open portions of the reflector 3, it is possible to prevent the LEDs from directly contacting the metal, and thereby to reduce the stresses to the LEDs attributable to vibrations or impacts.

Next, light propagation in the liquid crystal display device of the present invention will be described with reference to FIG. 3. The light from the LED 1 is made incident onto an incident surface 4A of the color-mixing optical waveguide 4 either directly or after being reflected by the reflector 3. Since the elastic light shielding spacer member 13 is provided between the LED 1 and the reflector 3, it is possible to prevent the light from leaking out of the gap between the LED 1 and the reflector 3. Then, the light made incident on the incident surface of the color-mixing optical waveguide 4 is propagated and subjected to color mixing inside the color-mixing optical waveguide 4. The light sufficiently mixed together and converted into the white light is emitted from an emitting surface 4B of the color-mixing optical waveguide 4 and is then incident on the reflector 6. The light incident on the reflector 6 is reflected and is then incident on an incident surface 5A into the optical waveguide 5.

The incident light on the optical waveguide 5 is reflected by the reflection sheet 9 and thereby spreads uniformly over the entire surface of the optical waveguide 5. Then, the light is emitted from an emitting surface (not shown) provided with the optical sheet 7 and the LCD panel 8.

Next, a liquid crystal display device according to a second embodiment of the present invention will be described. The shape of the light shielding spacer member 13 is modified in this embodiment. Configurations other than the light shielding spacer member 13 are the same as those in the liquid crystal display device according to the first embodiment of the present invention.

While the light shielding spacer member 13 is formed into the plate shape in the first embodiment, the light shielding spacer member 13 is formed into a box shape in this embodiment.

Specifically, the light shielding spacer member 13 of the box shape is put on the LEDs 1. Similarly to the above-described first embodiment, it is possible to use elastic resin such as epoxy resin, polyurethane resin or silicon resin as the material of the light shielding spacer member 13.

Figure 8:
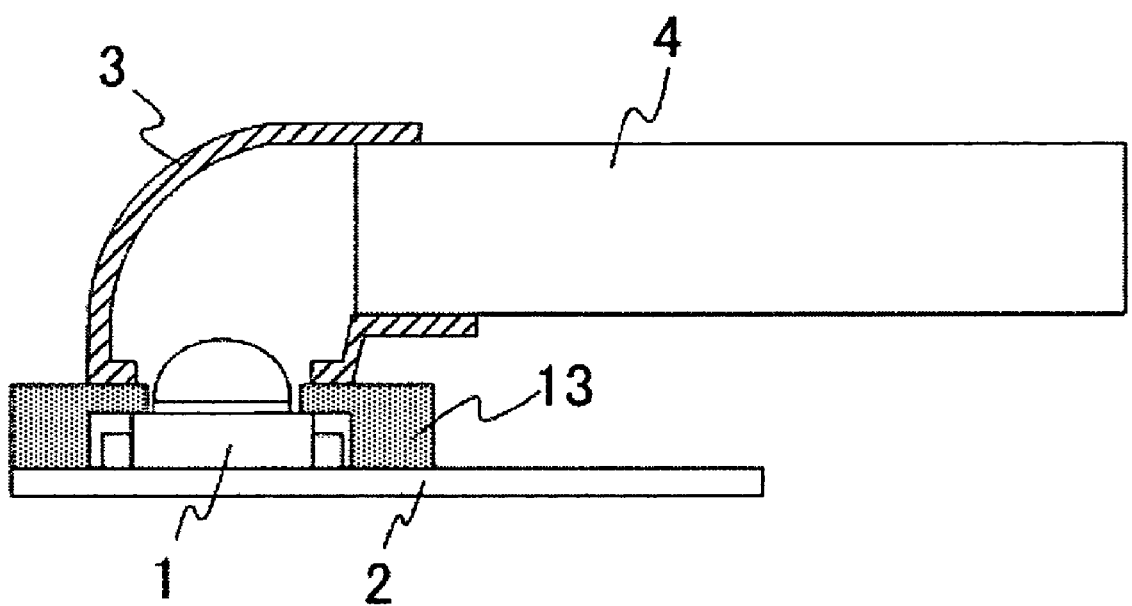
FIG. 8 is a cross-sectional view of an LED mounting substrate of a liquid crystal display device and its vicinity according to a second embodiment of the present invention.

FIG. 8 is a cross-sectional view of a substrate mounted with LEDs and its vicinity of the liquid crystal display device according to the second embodiment of the present invention applying the light shielding spacer member 13 of the box shape. In FIG. 8, the light shielding spacer member 13 is formed into the box shape, in which a surface thereof covers the LED 1 while a bottom surface thereof contacts the LED substrate 2. By using the light shielding spacer member 13 formed into the box shape, it becomes easier to align the light shielding spacer member 13 onto the LED substrate 2. Light propagation in the liquid crystal display device of this embodiment is similar to the case of the liquid crystal display device of the first embodiment. Accordingly, description thereof will be omitted.

Next, a liquid crystal display device according to a third embodiment of the present invention will be described. In the above-described first and second embodiment, the light shielding spacer member 13 is formed either into the plate shape or into the box shape. Moreover, the light shielding spacer member 13 is sandwiched between the reflector 13 and the LED 1 and is thereby fixed. In this embodiment, the light shielding spacer member 13 is fixed to a position where the reflector 13 contacts the LED 1.

Figure 9:
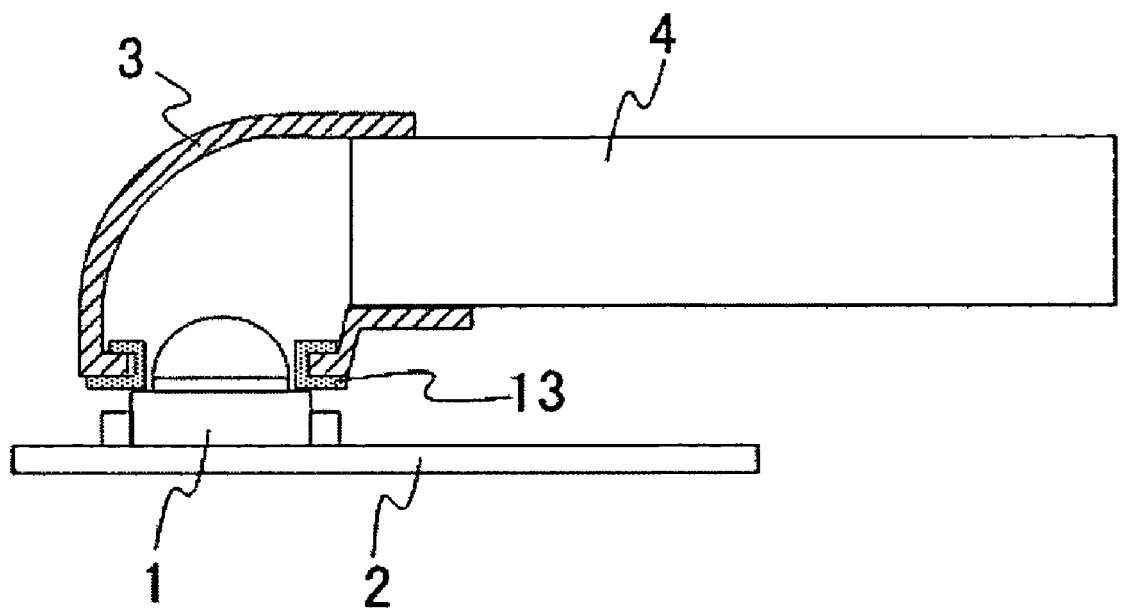
FIG. 9 is a cross-sectional view of an LED mounting substrate of a liquid crystal display device and its vicinity according to a third embodiment of the present invention.

FIG. 9 is a cross-sectional view of the LED mounting substrate and its vicinity of the liquid crystal display device according to the third embodiment of the present invention. As shown in FIG. 9, in the liquid crystal display device of this embodiment, the light shielding spacer member 13 is fixed to a side wall of the aperture 15 at a bottom of the reflector 3 and in the vicinity thereof.

The light shielding spacer member 13 of this embodiment can be formed by coating elastic resin on the side wall of the aperture 15 at the bottom of the reflector 3 and in the vicinity thereof. Epoxy resin, polyurethane resin, silicon resin, and the like can be used as the elastic resin material. The resin is preferably colored white in order to increase light reflectivity.

Another method of fixing the light shielding spacer member 13 to the reflector is to use the light shielding spacer member 13 having a ring shape which is molded by use of silicon resin. It is possible to use epoxy resin, polyurethane resin, silicon resin, and the like as the material of the ring-shaped light shielding spacer member 13. The resin is preferably colored white in order to increase light reflectivity. An inside diameter of this ring-shaped light shielding spacer member 13 is set smaller than the diameter of the aperture 15 at the bottom of the reflector 3, and an outside diameter thereof is set greater than the diameter of the aperture 15 at the bottom of the reflector 3. A concave portion is formed at an outer side wall of the ring-shaped light shielding spacer member 13 so as to allow insertion of a side wall end of the aperture 15. It is possible to fix the light shielding spacer member 13 to the reflector 3 by inserting an end part of the side wall of the aperture 15 of the reflector 3 into this concave portion.

According to the liquid crystal display device of this embodiment, it is possible to absorb fluctuation of the gap between the LED 1 and the reflector 3 by use of the above-described light shielding spacer member 13. Moreover, by using this light shielding spacer member 13, it is possible to avoid direct contact of the LED 1 with the reflector 3, and to reduce stresses on the LED attributable to vibrations and impacts.

In addition, by using the light shielding spacer member 13 of this embodiment, it becomes easier to dispose the reflector 3 on the LED substrate 2 as compared to the liquid crystal display devices of the first and second embodiments.

Light propagation in the liquid crystal display device of this embodiment is similar to the case of the liquid crystal display device of the first embodiment. Accordingly, description thereof will be omitted While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A liquid crystal display device, comprising:
   a liquid crystal display panel;
   a backlighting unit disposed behind the liquid crystal display panel, the backlighting unit including a light source and a reflector disposed to cover the light source from the liquid crystal display panel and configured to reflect substantially all light emitted from the light source to the liquid crystal display panel; and
   a light shielding spacer member attached directly to an entire lower surface of the reflector to prevent contact between the reflector and the light source,
   wherein an air gap is provided between an opening of the reflector, into which said light source is placed, and said light source, and
   wherein said light shielding spacer member extends other than into the opening of the reflector.

2. The liquid crystal display device according to claim 1, wherein the light shielding spacer member has a plate shape.

3. The liquid crystal display device according to claim 1, wherein the light shielding spacer member has a box shape and is disposed to allow a light emitting portion of the light source out of an aperture provided at a bottom of the box shape and to cover the light source.

4. The liquid crystal display device according to claim 1, wherein the light shielding spacer member comprises an elastic resin material.

5. The liquid crystal display device according to claim 1, wherein the backlighting unit further comprises an optical waveguide that guides the light emitted from the light source, which is entirely reflected by the reflector, before entering the optical waveguide.

6. The liquid crystal display device according to claim 5, further comprising:
   an optical sheet disposed on the optical waveguide of the backlighting unit.

7. The liquid crystal display device according to claim 1, wherein said light shielding spacer member shields all light transmission other than from said light source to said reflector.

8. A liquid crystal display device, comprising:
   a liquid crystal display panel; and
   a backlighting unit disposed behind the liquid crystal display panel, the backlighting unit including a light source, a first reflector, a first optical waveguide, a second reflector, a second optical waveguide, and a light shielding spacer member such that the first reflector is disposed to cover the light source and to reflect an entirety of light emitted from the light source to the first optical waveguide,
   wherein the first optical waveguide is arranged to allow the light reflected by the first reflector to be incident on an incident surface, and guiding the light toward an emitting surface,
   wherein the second reflector is arranged to reflect the light emitted from the first optical waveguide,
   wherein the second optical waveguide is disposed above the first optical waveguide to allow the light reflected by the second reflector to be incident, and to guide the light toward an entire surface,
   wherein the light shielding spacer member is attached directly to an entire lower surface of the first reflector to prevent contact between the first reflector and the light source and provides elastic cushioning between said reflector and said light source,
   wherein an air gap is provided between an opening of the first reflector, into which said light source is placed, and said light source, and
   wherein said light shielding spacer member extends other than into the opening of the first reflector.

9. The liquid crystal display device according to claim 8, further comprising:
   reflective means located on a back surface of the second optical waveguide in a space between the first optical waveguide and the second optical waveguide that reflects the light emitted from the back surface of the second optical waveguide and that allows the light to be incident on the second optical waveguide.

10. The liquid crystal display device according to claim 8, further comprising:
    an optical sheet disposed on the second optical waveguide of the backlighting unit.

11. The liquid crystal display device according to claim 8, wherein the light shielding spacer member includes a plate shape.

12. The liquid crystal display device according to claim 8, wherein the light shielding spacer member includes a box shape with an aperture provided at a bottom of the box shape and is disposed to allow a light emitting portion of the light source out of the aperture and to cover the light source.

13. The liquid crystal display device according to claim 8, wherein the light source comprises a plurality of light emitting diodes mounted on an insulating substrate and configured respectively to emit red light, blue light, and green light.

14. The liquid crystal display device according to claim 8, wherein each of the first reflector and the second reflector comprises a composite material formed by attaching transparent resin on which silver is evaporated to a metal plate selected from the group of aluminum, stainless steel, and brass.

15. The liquid crystal display device according to claim 8, wherein each of the first reflector and the second reflector comprises a composite material formed by attaching white resin to a metal plate selected from a group of aluminum, stainless steel, and brass.

16. The liquid crystal display device according to claim 8, wherein the light shielding spacer member comprises an elastic resin material.

17. The liquid crystal display device according to claim 16, wherein the elastic resin material is colored white.

18. The liquid crystal display device according to claim 16, wherein the elastic resin material is selected from a group of epoxy resin, polyurethane resin, and silicon resin.

19. An illuminated reflector device for a liquid crystal display, said device comprising:
- a light source including a plurality of light emitting diodes (LEDs) for illuminating the liquid crystal display;
- a reflector disposed to cover said light source and configured to reflect light emitted from said light source; and
- a light shielding spacer member attached directly to an entire lower surface of the reflector to prevent contact between said reflector and each of said plurality of LEDS by providing elastic cushioning between said reflector and each of said plurality of LEDs,
- wherein said light shielding spacer member prevents damage to said light source from force transmitted by said reflector,
- wherein a diameter of an aperture of the light shielding spacer member is set to be larger than an outside diameter of the light source and smaller than a diameter of an aperture of the reflector,
- wherein an air gap is provided between the aperture of the reflector, into which said light source is placed, and said light source, and
- wherein said light shielding spacer member extends other than into the aperture of the reflector.

20. The liquid crystal display device according to claim 19, wherein the illuminated reflector device further comprises an optical waveguide that guides the light emitted from the light source, which is entirely reflected by the reflector, before entering the optical waveguide.

* * * * *